F. SCHORIK & F. F. MARSHALL.
AUTOMATIC LIQUID MEASURING DEVICE.
APPLICATION FILED MAY 31, 1912.

1,074,386.

Patented Sept. 30, 1913.

5 SHEETS—SHEET 1.

Witnesses:

Inventors:
Frank Schorik,
Frank F. Marshall,
By Joshua R. H. Potts
Their Attorney.

F. SCHORIK & F. F. MARSHALL.
AUTOMATIC LIQUID MEASURING DEVICE.
APPLICATION FILED MAY 31, 1912.

1,074,386.

Patented Sept. 30, 1913.

5 SHEETS—SHEET 2.

Witnesses:
C. E. Wessels.
A. A. Olson.

Inventors:
Frank Schorik,
Frank F. Marshall,
By Joshua R. H. Potts
their Attorney.

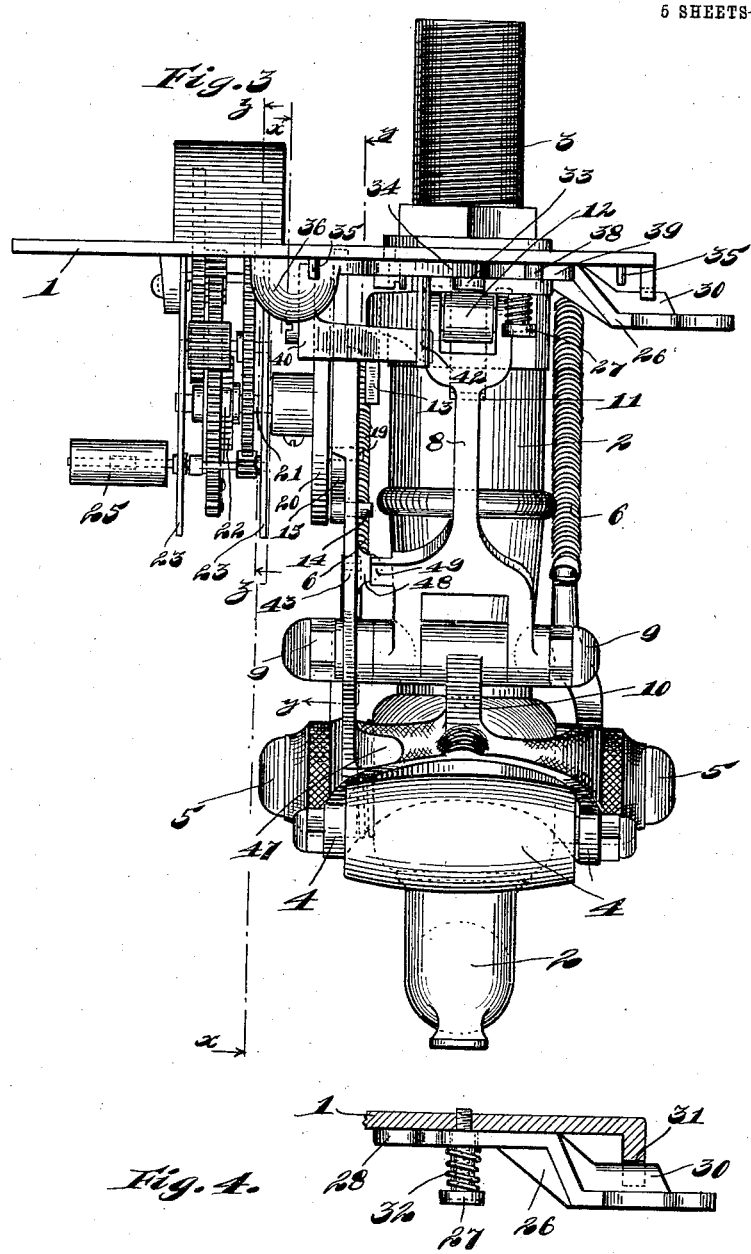

F. SCHORIK & F. F. MARSHALL.
AUTOMATIC LIQUID MEASURING DEVICE.
APPLICATION FILED MAY 31, 1912.
1,074,386.
Patented Sept. 30, 1913.
5 SHEETS—SHEET 4.
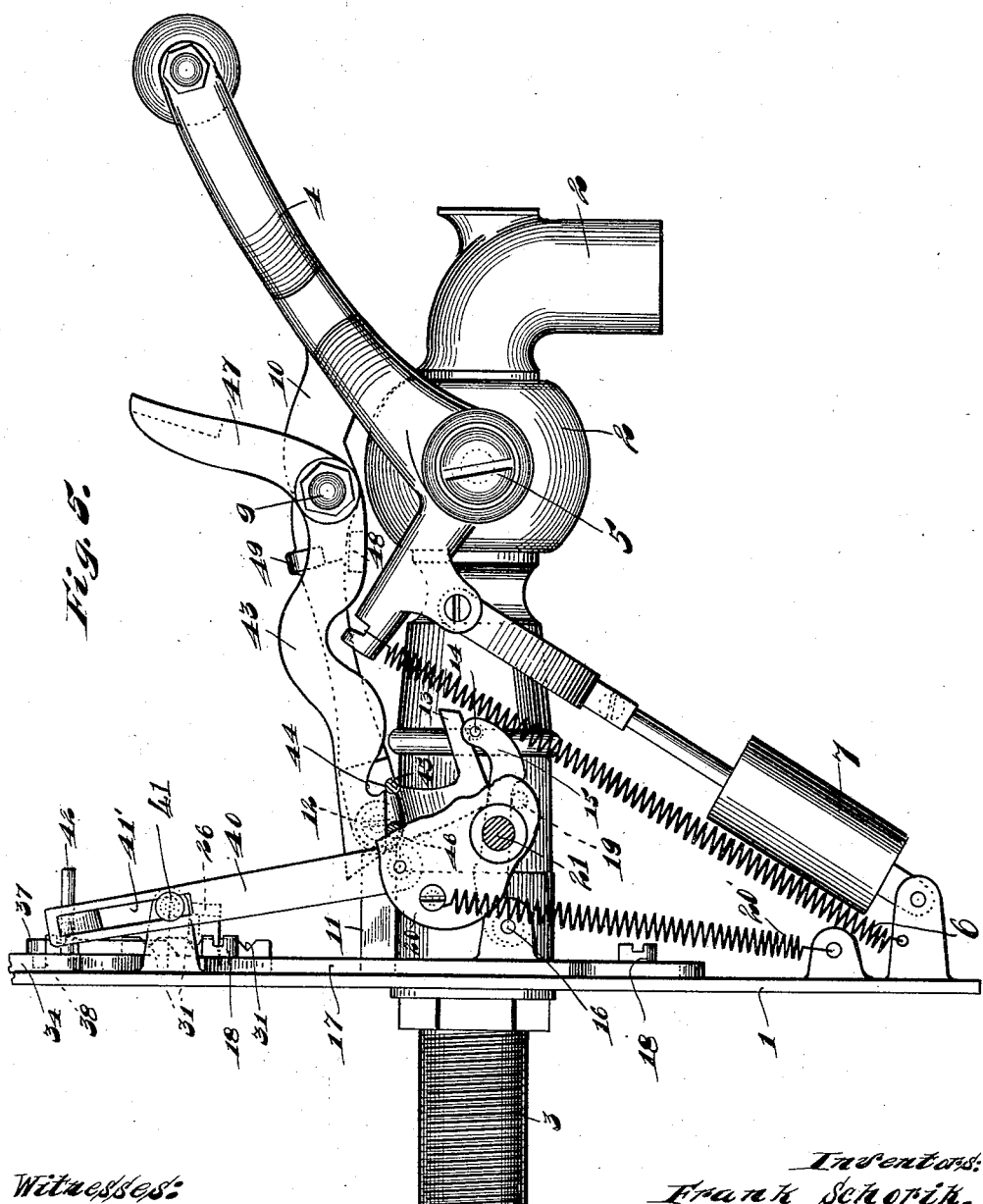

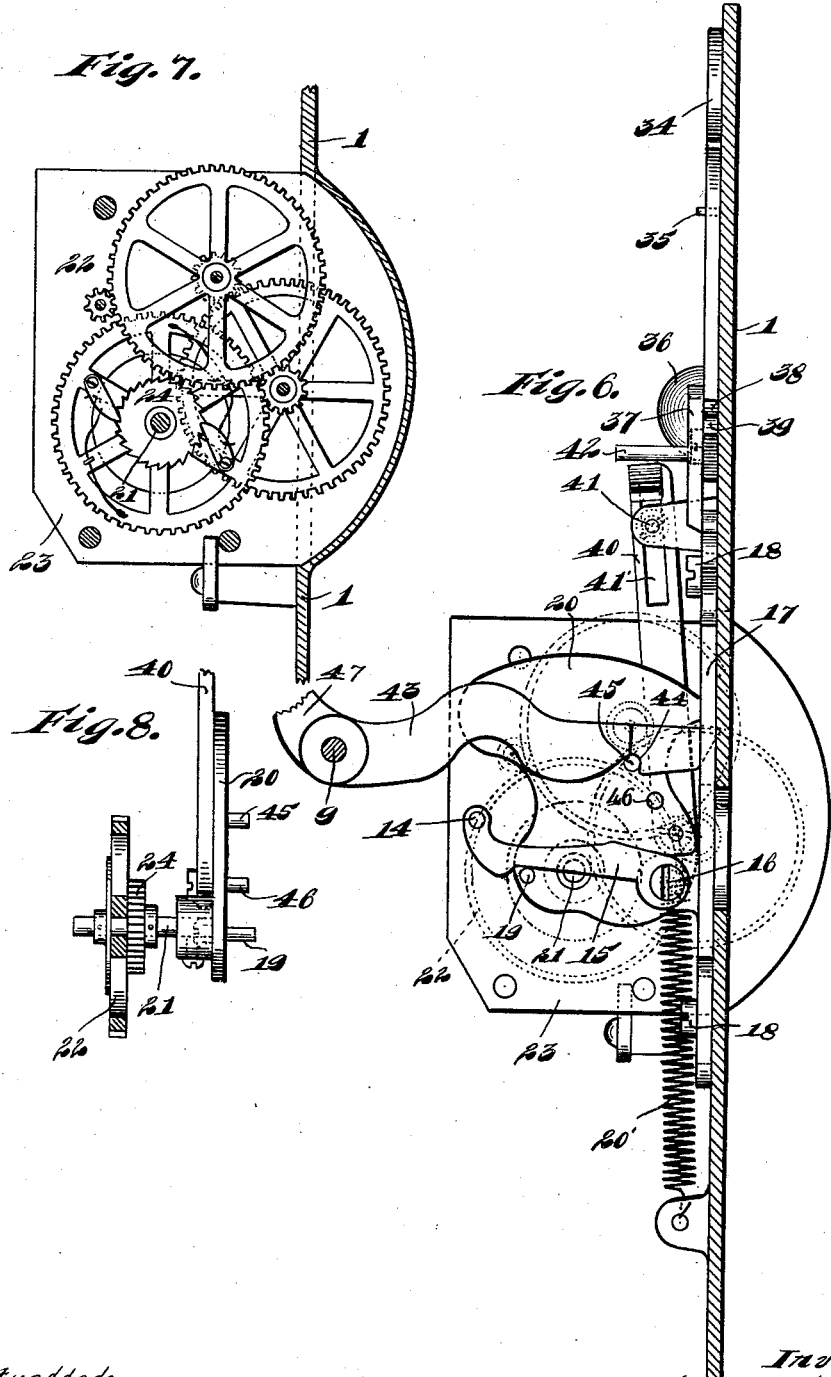

UNITED STATES PATENT OFFICE.

FRANK SCHORIK AND FRANK F. MARSHALL, OF CHICAGO, ILLINOIS.

AUTOMATIC LIQUID-MEASURING DEVICE.

1,074,386. Specification of Letters Patent. Patented Sept. 30, 1913.

Application filed May 31, 1912. Serial No. 700,570.

*To all whom it may concern:*

Be it known that we, FRANK SCHORIK and FRANK F. MARSHALL, citizens of the United States, and residents of the city of Chicago, county of Cook, and State of Illinois, have invented certain new and useful Improvements in Automatic Liquid-Measuring Devices, of which the following is a specification.

Our invention relates to improvements in automatic liquid measuring devices, and has for its object the production of a device of this character which will be positive and quick-acting in operation, and which will be durable and economical in construction.

Other objects will appear hereinafter.

With these objects in view, our invention consists in the combinations and arrangements of parts hereinafter described and claimed.

Our invention will be more readily understood by reference to the accompanying drawings forming a part of this specification, and in which—

Figure 1:
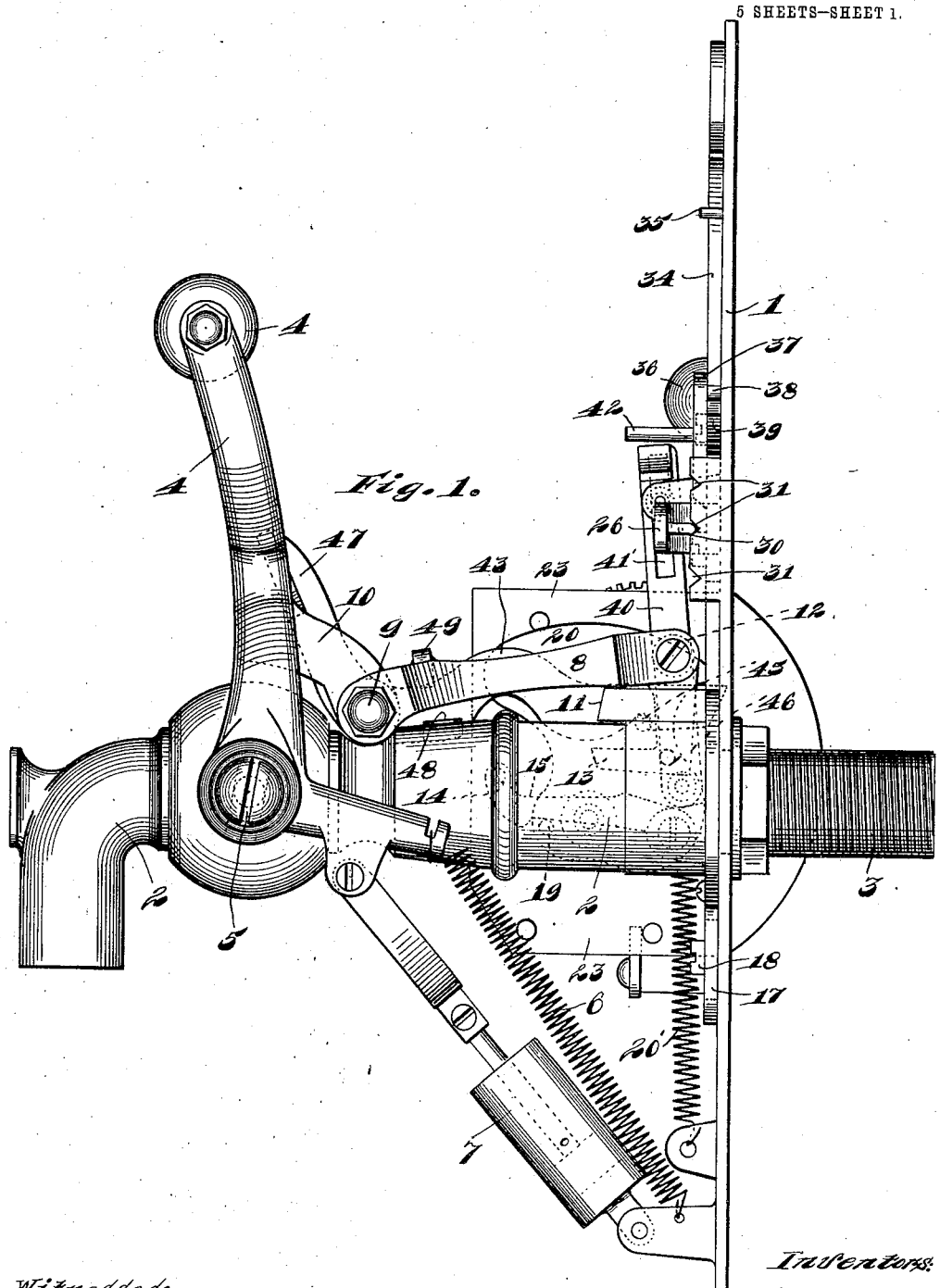
Figure 2:
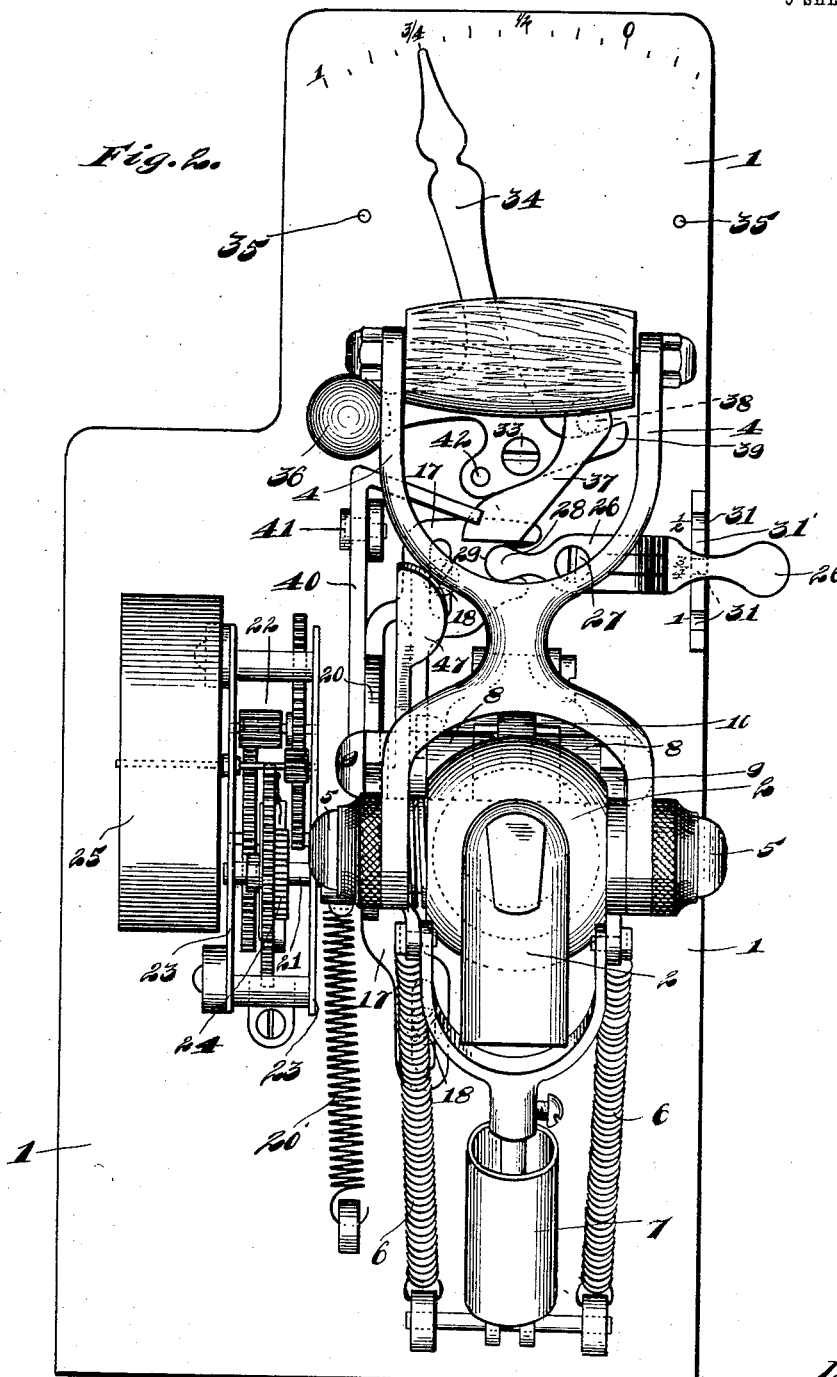

Figure 1 is a side elevation of a liquid measuring device embodying our invention, Fig. 2 is a front elevation thereof, Fig. 3 is a top plan view thereof, Fig. 4 is a sectional detail of a setting lever included in the construction, Fig. 5 is a vertical section taken on substantially line *x x* of Fig. 3, Fig. 6 is a vertical section taken on substantially line *y y* of Fig. 3, Fig. 7 is a vertical section taken on substantially line *z z* of Fig. 3, and Fig. 8 is a fragmentary sectional detail of a portion of the construction shown in Fig. 7.

The preferred form of construction, as illustrated in the drawings, comprises a base plate 1 upon the front side of which is secured a forwardly projecting spout 2 of any ordinary or preferred design, the rear end of said spout being provided with a threaded nipple 3 for connection with any suitable source of liquid supply. The operating handle 4 of the valve of the faucet 2 is adapted to oscillate upon fulcrums 5, the construction being such that, when said handle is in vertical position, as shown particularly in Fig. 1, the faucet valve will be closed, and when said handle is in forwardly tilted position, as shown in Fig. 5, said faucet valve will be open to permit of the passage of liquid from the faucet. Coöperating with the handle 4 are helical tension springs 6 which serve to normally hold said handle in closed position. Also coöperating with said handle is a dash pot 7 which, when the device is in use, serves to absorb any jar which otherwise would be incident to the sudden return movement and stopping of the handle 4 when released and influenced by the springs 6.

The handle 4 is releasably held in open position through the medium of a detent 8, one end of which is pivotally secured by a pivot pin 9 to a lug 10 formed upon the rearward side of handle 4. The arrangement is such that, when the handle 4 is rocked to open position, the detent 8 will be moved forwardly and the free end thereof, when said handle reaches its open position, will drop by gravity to position against a stationary stop 11 and thus serve to retain said handle in open position. The free end of detent 8 is provided with a roller 12 in order to alleviate friction in moving into and out of engagement with the stop 11.

In use, it is desired to trip the detent 8 to release the handle 4 at the expiration of a predetermined interval or after a predetermined quantity of liquid has been permitted to flow through the faucet. The mechanism for effecting this tripping of the detent 8 comprises a depending angular finger 13 which is formed at the free end of the detent. The lower end of finger 13, when the handle 4 is in open position, is positioned in the path of a stud 14 which is carried at the free end of a lever 15 which is fulcrumed at 16 upon a base member 17 mounted for vertical adjustment upon the front side of plate 1, as clearly shown in Fig. 5. The connection of member 17 with the plate 1 is through the medium of headed screws 18 which engage elongated slots provided in said member 17 which permit of vertical movement thereof, as will be readily understood. The free end of the lever 15 rests upon a stud 19 which projects from one side of an oscillatory plate 20 which is carried at one extremity of an oscillatory shaft 21. The arrangement is such, as will be observed, that oscillation of the plate 20 in one direction will effect upward rocking of the free end of lever 15, such rocking of said lever causing the latter to engage the finger 13 of detent 8 and rock said finger and hence said detent to releasing position relative to the stop 11. This operative rocking or partial rotation of the plate 20 is effected by a helical tension spring 20′, said spring, after rotation or oscillation of said plate in the opposite direction, in order to extend said spring into a condition of tension or in order to set said spring, being adapted to operatively rotate or oscillate said plate in the manner above mentioned.

Connected with the shaft 21 is a train of gears 22 which is mounted between bearing plates 23 secured to and forwardly projecting from the plate 1. The gears 22 are operatively connected with the shaft 21 through the medium of a pawl-and-ratchet mechanism 24, the arrangement being such that operative connection between said gears and said shaft will be established only when said shaft is operatively moved, retrograde rotation of said shaft, as when setting the spring 20′, being permitted without affecting said gears. Coöperating with the gears 22 is a rotatable blade 25 which together with said gears serves in the capacity of a governor to control or govern the oscillatory movement of the plate 20.

With the construction set forth it will be seen that, in the operation of the device, when the faucet handle is moved to open position, (this movement of said handle, as will be hereinafter described, effecting the setting rotation of the plate 20,) the same will be retained in open position through the medium of the detent 8 until the plate 20 is rotated through the influence of the spring 20′ sufficiently to cause the lever 15 to be rocked upwardly in order to trip said detent. Thus it will be seen that the duration of the interval at the expiration of which the faucet handle is rocked to closed position, will be determined by the angular position of the lever 15 or by the proximity of the stud 14 to the finger 13 of the detent 8, it being understood that the greater the distance it is required to move the stud 14 in order to trip the detent, the longer the duration of the interval at the expiration of which the faucet handle is released. This being so, it will be clear that adjustment of the duration of this interval may be effected by angularly adjusting the lever 15. This adjustment of the lever 15 is secured through the employment of an oscillatory member 26 which is pivotally secured at 27 upon the front side of the plate 1. One end 28 of the member 26 engages a recess 29 in the upper end of the member 17 to which the rearward end of the lever 15 is fulcrumed, as will be remembered. The arrangement is such, as will be seen, that tilting of the member 26 will effect vertical movement of the member 17 and hence angular adjustment of the lever 15.

The member 26 is formed at its outer end with a flange 30 adapted to engage notches 31 provided in a flange 31′ formed upon the adjacent side of plate 1, said notches being provided for holding said lever in various positions of adjustment, a helical compression spring 32 coöperating with the lever 26, as clearly shown in Fig. 4, for yieldingly holding the flange 30 in engagement with the notches 31. Fulcrumed at 33 upon the plate 1 is an indicator or finger 34 which coöperates with a scale or graduations provided at the upper end of plate 1. The indicator 34 is adapted to oscillate between studs 35 which determine the amplitude of oscillation of said indicator. At the lower end of said indicator is provided a weight 36 which serves to normally hold said indicator in a position against the left-hand stop 35. Formed at the upper end of member 17 is an extension 37 provided at its upper end with a rearwardly projecting stud 38 adapted to engage with a laterally projecting finger 39 formed at the base of indicator 34.

With this arrangement it will be seen that an operative connection is established between the member 17 and hence the tripping lever 15 and the adjusting lever 26, the graduations coöperating with indicator 34 indicating the amount of liquid which will be discharged from the faucet when the operating handle is moved to open position with the arrangement of the parts at any particular time. Pivotally connected at its lower end with the plate 20 is an upwardly projecting bar 40, the upper end 41 of said bar being maintained in position through the medium of a stud which engages an elongated slot 41′ in said bar. The upper end of said bar is offset for engagement with an outwardly projecting pin 42 provided at the lower end of indicator 34. With this arrangement, when the plate 20 is rotated to set the spring 20′, the member 40 will be elevated thereby so that the upper end of said member will engage the pin 42 and thereby rock the indicator 34, the arrangement being such that, when the plate 20 has reached the terminal of its setting movement or when the handle 4 is in fully open position, the indicator 34 will be at the zero point. As the plate 20 operatively rotates, the member 40 will gradually move downwardly, permitting of the indicator 34 to gradually rock to the left, thereby automatically indicating the progress of the discharge from the faucet; the arrangement being such that, when the indicator reaches the position which is determined by the stud 38, the faucet handle will be released for rocking to closing position.

Operative connection between the faucet handle 4 and the plate 20 is effected by a lever 43 which is fulcrumed at one end upon the pivot pin 9. The free end of the lever 43 is provided with a recess 44 which is adapted, when said lever is in a position at its rearward terminal of movement or with the handle 4 in closed position, to engage a stud 45 which projects from one side of the plate 20, and so that, when the handle 4 is rocked to open position causing forward drawing of the lever 43, the latter will engage said stud 45 and impart rotary movement to the plate 20 in order to extend or set the spring 20'. When the lever 43 is close to the forward terminal of its movement, the free end thereof will be engaged by a stud 46 carried by the plate 20 which will cause said lever to be rocked out of engagement with the stud 45, when said lever reaches its forward terminal of movement. Thus it will be seen that forward rocking of the faucet handle to open the faucet effects automatic setting of the tripping mechanism which, as above described, will trip the detent which holds the faucet handle in open position at the expiration of a predetermined interval.

At the pivoted end of the lever 43 is provided an upwardly projecting handle 47, whereby the lever 43 may be rocked upwardly to inoperative position if desired, in order to annul the operative connection between the faucet handle and the retaining and tripping mechanism coöperating therewith, an ear 48 provided upon the lever 43 being adapted to engage an ear 49 provided upon the detent 8, so that, when the former is rocked to inoperative position, the same will support the detent 8 and prevent the free end thereof dropping to engagement with the stop 11. The handle 47 is arranged in close proximity with the handle 4 so that movement thereof to annul the operative connection, as mentioned, may be effected with little difficulty.

In operating the device it is first required to adjust the lever 26 so as to position the indicator 34 to indicate the amount it is desired to draw. The receptacle is then arranged under the faucet and the handle 4 rocked forwardly. When the handle 4 is at its forward terminal of oscillation the detent 8 will drop to position in engagement with the stop 11 and thus serve to hold the handle 4 in its forwardly tilted position and hence the faucet in open position to permit of the escape of the liquid therefrom. In this forward tilting of the handle 4 the lever 43 which is connected therewith engages the stud 45 of the plate 20 causing forward oscillation of the latter and hence tensioning of the spring 20'. As the handle 4 approaches its forward terminal of oscillation the lever 43 is disengaged from the stud 45 through engagement of the free end of said lever with stud 46 carried upon plate 20. Upon disengagement of the stud 45 from the lever 43 the plate 20 is caused to reversely oscillate under the influence of spring 20' which was placed in tension upon forward oscillation of said plate. As the plate 20 moves reversely to initial position the stud 19 carried thereby causes elevation of the free end of lever 15, the stud 14 at the free end of said lever 15, when the plate 20 nears its initial position in returning, is moved into contact with the finger 13 of the detent 8 causing tripping of the latter and hence release of the handle 4 which is returned to closing position by means of springs 6. Thus the measuring of the liquid is automatically effected, it being only necessary, after setting of the device to indicate the amount of liquid desired, to rock the handle 4 to open position, the release of said handle to cause closing of the valve, after the desired quantity of liquid has been discharged from the faucet, being automatically effected. Through tilting adjustment of the lever 26 the vertical position of the pivotal point 16 of the lever 15 may be varied to thereby vary the duration of the interval at the expiration of which the detent 8 will be tripped by said lever 15 and hence to vary the quantity of liquid which is discharged from the faucet before tripping of the same.

An automatic liquid measuring device of the construction set forth is durable and economical in construction, and through the employment of a device of this character time may be saved and hence extra expense avoided, especially in bar rooms or other similar places where at the present time the bartender or operator is required to manually operate the faucet handle in both opening and closing the same, he being required to remain at the faucet during the pouring or discharging.

While we have illustrated and described the preferred form of construction for carrying our invention into effect, this is capable of variation and modification without departing from the spirit of the invention. We, therefore, do not wish to be limited to the exact details of construction set forth, but desire to avail ourselves of such variations and modifications as come within the scope of the appended claims.

Having described our invention, what we claim as new and desire to secure by Letters Patent, is:

1. A liquid measuring device comprising a normally closed faucet having an oscillatory operating handle; an oscillatory detent for releasably retaining said handle in open position; oscillatory means for tripping said detent to release said handle at the expiration of a predetermined interval, said means being adjustable for varying the duration of said interval; means for oscillating said tripping means; and an operative connection between said last mentioned means and said faucet handle, whereby movement of said faucet handle to open position effects the setting of said means for operation, substantially as described.

2. A liquid measuring device comprising a normally closed faucet having an oscillatory operating handle; an oscillatory detent for releasably retaining said handle in open position; oscillatory means for tripping said detent to release said handle at the expiration of a predetermined interval, said means being adjustable for varying the duration of said interval; means for oscillating said tripping means; an operative connection between said last mentioned means and said faucet handle, whereby movement of said faucet handle to open position effects the setting of said means for operation; and a train of gears and a rotary governor for governing the movement of said operating means when released, substantially as described.

3. A liquid measuring device comprising a faucet having a movable operating handle; means for releasably retaining said handle in open position; adjustable means for tripping said retaining means at the expiration of a predetermined interval; resilient means for operating said tripping means; an operative connection between said faucet handle and said operating means, whereby movement of said handle to open position effects setting of said operating means for actuating said tripping means; and means for governing the operation of said operating means, substantially as described.

4. A liquid measuring device comprising a faucet having a movable operating handle; means for releasably retaining said handle in open position; adjustable means for tripping said retaining means at the expiration of a predetermined interval; resilient means for operating said tripping means; means for governing the operation of said operating means, said governing means comprising a train of gears; and a rotary blade coöperating with said gears, substantially as described.

5. A liquid measuring device comprising a normally closed faucet having an oscillatory operating handle; an oscillatory detent for releasably retaining said handle in open position; an oscillatory lever for tripping said detent to release said handle; means for oscillating said lever to effect tripping of said detent at the expiration of a predetermined interval, said means comprising an oscillatory member adapted when actuated to oscillate said tripping lever; means for operating said oscillatory member; and means for adjusting the position of said lever relative to said detent for varying the duration of the before mentioned interval, substantially as described.

6. A liquid measuring device comprising a normally closed faucet having an oscillatory operating handle; an oscillatory detent for releasably retaining said handle in open position; an oscillatory lever for tripping said detent to release said handle; means for oscillating said lever to effect tripping of said detent at the expiration of a predetermined interval, said means comprising an oscillatory member adapted when actuated to oscillate said tripping lever; means for operating said oscillatory member; and manually adjustable means for adjusting the position of said tripping lever relative to said detent for varying the duration of the before mentioned interval, substantially as described.

7. A liquid measuring device comprising a normally closed faucet having an oscillatory operating handle; an oscillatory detent for releasably retaining said handle in open position; an oscillatory lever fulcrumed at one end and having its other end free for contact with said detent for tripping the same to release said handle; means for oscillating said lever to effect tripping of the detent at the expiration of a predetermined interval, said means comprising a movable member engaging with said lever intermediate its extremities; means for operating said movable member; and means for adjusting the fulcrum of said tripping lever for varying the duration of the before mentioned interval, substantially as described.

8. A liquid measuring device comprising a normally closed faucet having an oscillatory operating handle; an oscillatory detent for releasably retaining said handle in open position; an oscillatory lever fulcrumed at one end and having its other end free for contact with said detent for tripping the same to release said handle; means for oscillating said lever to effect tripping of the detent at the expiration of a predetermined interval, said means comprising a movable member engaging with said lever intermediate its extremities; means for operating said movable member; and an adjustably mounted member to which said tripping lever is fulcrumed whereby the fulcrum of said lever may be varied for varying the duration of the before mentioned interval, substantially as described.

9. A liquid measuring device comprising a normally closed faucet having an oscillatory operating handle; an oscillatory detent for releasably retaining said handle in open position; an oscillatory lever for tripping said detent to release said handle; means for oscillating said lever to effect tripping of said detent at the expiration of a predetermined interval, said means comprising an oscillatory member adapted when actuated to oscillate said tripping lever; means for operating said oscillatory member; means for adjusting the position of said lever relative to said detent for varying the duration of the before mentioned interval; and an oscillatory indicator connected for movement simultaneously with said tripping lever and for adjustment of its amplitude of oscillation simultaneously with the adjustment of said tripping lever, substantially as described.

10. A liquid measuring device comprising a faucet having a movable operating handle; means for releasably retaining said handle in open position; adjustable means for tripping said retaining means at the expiration of a predetermined interval; an operative connection between said handle and said tripping means, whereby movement of said handle to open position effects setting of said tripping means for operation; and manually operable means for annulling the operative connection between said handle and said tripping means, substantially as described.

In testimony whereof we have signed our names to this specification in the presence of two subscribing witnesses.

FRANK SCHORIK.
FRANK F. MARSHALL.

Witnesses:
JOSHUA R. H. POTTS,
J. SIMONS.

Copies of this patent may be obtained for five cents each, by addressing the "Commissioner of Patents, Washington, D. C."